(12) United States Patent
Bowers

(10) Patent No.: US 8,640,815 B2
(45) Date of Patent: Feb. 4, 2014

(54) BOOT ASSEMBLY

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 274 days.

(21) Appl. No.: 13/024,483

(22) Filed: Feb. 10, 2011

(65) Prior Publication Data

US 2012/0205181 A1  Aug. 16, 2012

(51) Int. Cl.
*F16D 3/84* (2006.01)

(52) U.S. Cl.
USPC ........... 180/344; 277/634; 277/636; 285/236; 464/173; 464/175

(58) Field of Classification Search
USPC .......... 180/337, 339, 334, 346; 464/173, 175; 285/226, 229, 235, 236; 292/256; 74/18.1, 18.2; 277/634–636; 403/50, 403/51, 135; 24/20 W, 20 R
See application file for complete search history.

(56) References Cited

U.S. PATENT DOCUMENTS

| | | | |
|---|---|---|---|
| 3,688,523 A * | 9/1972 | Lutz Schafer et al. ........ | 464/175 |
| 3,797,077 A | 3/1974 | Omori et al. | |
| 4,091,511 A | 5/1978 | Reddy | |
| 4,701,982 A | 10/1987 | Matsuno et al. | |
| 4,914,788 A | 4/1990 | Ojima | |
| 4,987,651 A | 1/1991 | Oetiker | |
| 5,033,167 A | 7/1991 | Uchman | |
| 5,044,814 A | 9/1991 | Hama | |
| 5,103,535 A | 4/1992 | Ishijima | |
| 5,183,351 A | 2/1993 | Schneider | |
| 6,185,793 B1 | 2/2001 | Kitamura et al. | |
| 6,209,885 B1 * | 4/2001 | Mukaida et al. ............... | 277/634 |
| 6,224,066 B1 | 5/2001 | Oetiker | |
| 6,244,967 B1 * | 6/2001 | Takabe et al. ................. | 464/175 |
| 6,406,034 B1 | 6/2002 | Alcantara et al. | |
| 6,540,618 B1 | 4/2003 | MacDonald et al. | |
| 6,558,262 B1 | 5/2003 | Breidenbach et al. | |
| 6,687,960 B2 | 2/2004 | Kitamura et al. | |
| 6,938,902 B2 * | 9/2005 | Devers ......................... | 277/634 |
| 7,207,891 B2 | 4/2007 | Kashiwagi et al. | |
| 7,395,582 B2 * | 7/2008 | Bowers ........................ | 24/20 W |
| 2005/0051973 A1 | 3/2005 | Wang | |
| 2005/0173872 A1 | 8/2005 | Ogino | |
| 2006/0170141 A1 | 8/2006 | Wette | |
| 2008/0032843 A1 * | 2/2008 | Ebihara et al. .................. | 475/83 |
| 2008/0132341 A1 * | 6/2008 | Momiyama et al. .......... | 464/175 |
| 2009/0017923 A1 * | 1/2009 | Okubo .......................... | 464/175 |
| 2010/0219590 A1 * | 9/2010 | Watanabe et al. ............. | 277/634 |

* cited by examiner

*Primary Examiner* — James English

(74) *Attorney, Agent, or Firm* — Ulmer & Berne LLP

(57) ABSTRACT

A boot assembly includes a boot and a retention band. The retention band includes a ring, a lever attached to the ring and a clasp associated with the ring and configured for selective engagement with the lever. The boot includes an annular wall defining a hollow interior configured to receive a portion of a drive assembly of a vehicle. The boot further includes a rib, the rib being integral with the annular wall and extending radially outwardly from the annular wall. The rib and the annular wall cooperate to define an annular channel that is configured to receive the retention band. The rib extends radially outwardly beyond the ring, the lever and the clasp of the retention band when the retention band is seated within the annular channel.

27 Claims, 5 Drawing Sheets

BOOT ASSEMBLY

TECHNICAL FIELD

A boot assembly of a drive assembly of a vehicle is provided.

BACKGROUND

Some conventional all terrain vehicles include a rear drive assembly that couples a transmission to a rear final gear, which in turn is coupled to each rear wheel. The rear drive assembly includes an output shaft of the transmission and a rear drive shaft coupled to the rear final gear. A universal joint couples the output shaft of the transmission and the rear drive shaft. A boot surrounds the universal joint and forward and rearward retention bands secure the boot in place.

The retention bands are partially exposed during operation of the all terrain vehicle such that passing debris is prone to becoming entangled upon the rear drive shaft, which adversely affects the balance of the rear drive shaft. Additionally, the locking clasps of the retention bands are prone to being released by the passing debris.

SUMMARY

According to one embodiment, a boot assembly includes a boot and a first retention band that includes a first ring, a first lever attached to the first ring and a first clasp associated with the first ring and configured for selective engagement with the first lever. The boot includes an annular wall defining a hollow interior configured to receive a portion of a drive assembly of a vehicle. The boot further includes a first rib, the first rib being integral with the annular wall and extending radially outwardly from the annular wall. The first rib and the annular wall cooperate to define a first annular channel. The first annular channel is configured to receive the first retention band. The first rib extends radially outwardly beyond the first ring, the first lever and the first clasp of the first retention band when the first retention band is seated within the first annular channel.

According to another embodiment, a drive assembly includes a first rotatable shaft, a second rotatable shaft and a joint coupling the first rotatable shaft with the second rotatable shaft. The drive assembly further includes a boot assembly that includes a boot and a first retention band. The first retention band includes a first ring, a first lever attached to the first ring and a first clasp associated with the first ring. The boot includes an annular wall defining a hollow interior. At least a portion of the joint is positioned within the hollow interior such that the boot surrounds the at least a portion of the joint. The boot further includes a first rib that is integral with the annular wall and extends radially outwardly from the annular wall. The first rib and the annular wall cooperate to define a first annular channel. The first retention band is positioned within the first annular channel and the first clasp engages the first lever such that the first retention band is seated within the first annular channel and secures the boot to one of the joint and the first rotatable shaft. The first rib extends radially outwardly beyond the first ring, the first lever and the first clasp of the first retention band when the first retention band is seated within the first annular channel.

According to another embodiment, a vehicle includes at least one front wheel and at least one rear wheel. The vehicle also includes a frame, and each of the at least one front wheel and the at least one rear wheel is suspended from the frame. The vehicle also includes an engine and a transmission coupled with the engine. The vehicle also includes a drive assembly coupled with one of the at least one front wheel and the at least one rear wheel. The drive assembly includes a first rotatable shaft, a second rotatable shaft and a joint coupling the first rotatable shaft with the second rotatable shaft. The drive assembly further includes a boot assembly. The boot assembly includes a boot and a first retention band. The boot includes an annular wall defining a hollow interior. At least a portion of the joint is positioned within the hollow interior such that the boot surrounds the at least a portion of the joint. The boot further includes a first rib. The first rib is integral with the annular wall and extends radially outwardly from the annular wall. The first rib and the annular wall cooperate to define a first annular channel. The first retention band includes a first ring, a first lever attached to the first ring and a first clasp associated with the first ring. The first retention band is positioned within the first annular channel and the first clasp engages the first lever such that the first retention band is seated within the first annular channel and secures the boot to one of the joint and the first rotatable shaft. The first rib extends radially outwardly beyond the first ring, the first lever and the first clasp of the first retention band when the first retention band is seated within the first annular channel.

BRIEF DESCRIPTION OF THE DRAWINGS

Various embodiments according to the inventive principles will become better understood with regard to the following description, appended claims and accompanying drawings wherein:

DETAILED DESCRIPTION

Figure 1:
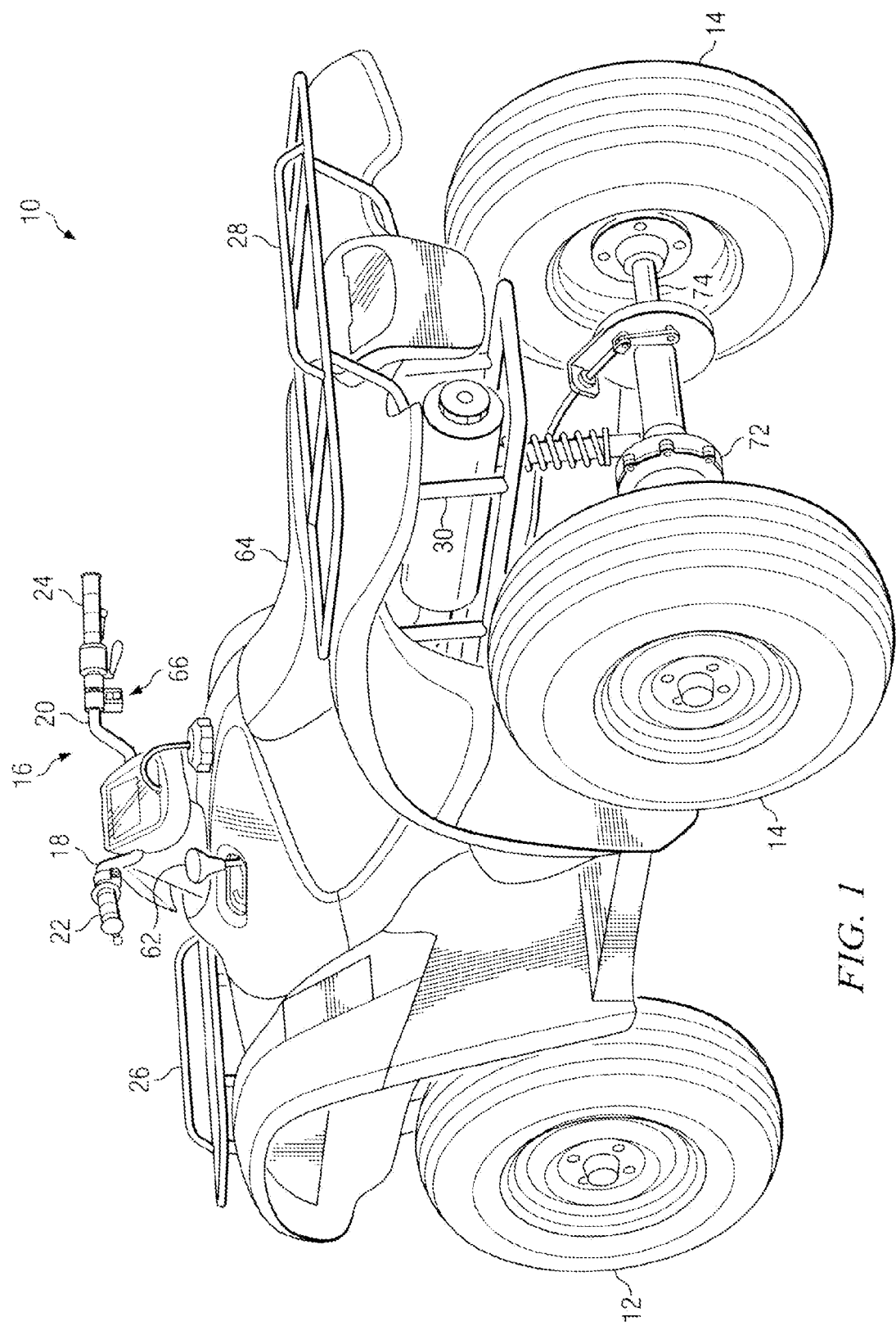
FIG. 1 is a perspective view of a vehicle.

Certain embodiments are herein described in connection with the views and examples of FIGS. 1-7 wherein like numbers indicate the same or corresponding elements throughout the views. FIG. 1 illustrates a vehicle 10 which is shown to be an all terrain vehicle ("ATV"). However, a vehicle in accordance with alternative embodiments can be an automobile, a truck, a van, a recreational vehicle, a utility vehicle, agricultural equipment, construction equipment, or a mower, for example.

The vehicle 10 can include a pair of front wheels 12 and a pair of rear wheels 14. The front wheels 12 can comprise steerable wheels. A handlebar assembly 16 can be operably coupled with the front wheels 12 to facilitate steering of the front wheels 12. The handlebar assembly 16 can include left and right handlebars 18, 20, a left hand grip 22 secured to the left handlebar 18, and a right hand grip 24 secured to the right handlebar 20. The vehicle 10 can also include front and rear cargo racks 26, 28 that can be respectively supported at the front and rear of the vehicle 10 by a frame (e.g., 30). The front and rear cargo racks 26, 28 can facilitate support of cargo for transportation by the vehicle 10. Although the front and rear cargo racks 26, 28 are shown in FIG. 1 to comprise tubular frame assemblies, it will be appreciated that the front and rear cargo racks 26, 28 can be configured in any of a variety of suitable alternative arrangements for carrying cargo.

Figure 2:
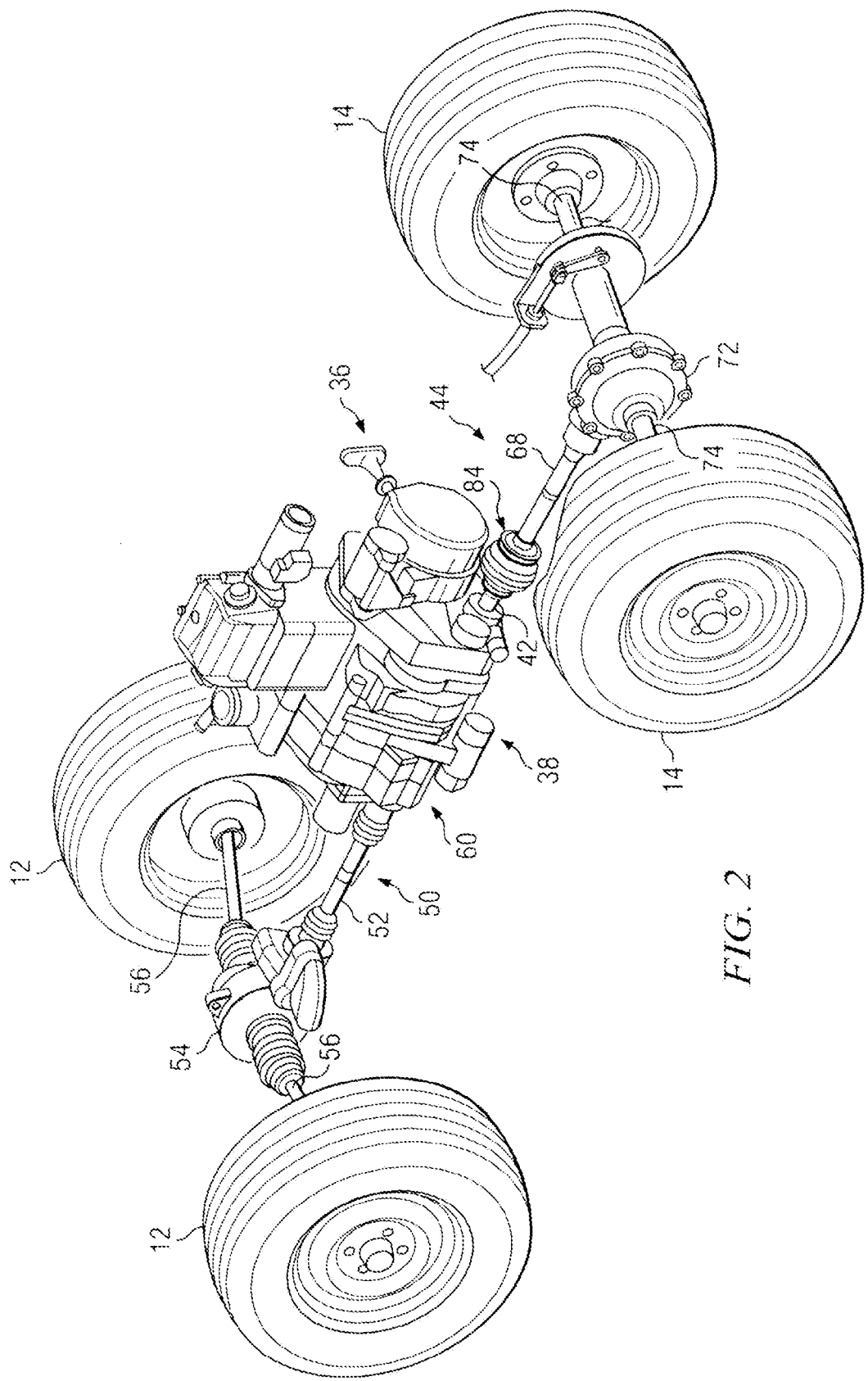
FIG. 2 is a perspective view depicting portions of the vehicle shown in FIG. 1, including a rear drive assembly that includes a boot assembly according to one embodiment.

Vehicle 10 can include an engine 36, which can be an internal combustion engine as shown generally in FIG. 2. Alternatively, vehicle 10 can include one or more electric motors, or other source of motive power. Vehicle 10 can also include a transmission 38 that can be a hydraulic-type transmission, a hydrostatic-type transmission, a belt-driven transmission, or any of a variety of other suitable transmission arrangements. In one embodiment, the transmission 38 can be an automated manual transmission ("AMT") that can be shifted between operating modes by transmission switch 66 (FIG. 1). The transmission switch 66 can be movable between an upshift position and a downshift position, and a user can selectively actuate the transmission switch 66 to select from among a variety of operating ranges.

The transmission 38 can include an input and an output. The input and output of the transmission 38 can be associated with each other such that operation of the input facilitates operation of the output. As is common, the transmission 38 can be coupled with the engine 36 and can operate in a variety of modes such that the engine 36 can drive the wheels 12, 14 at a variety of different speeds and torques, and in different directions. In one embodiment, and as illustrated in FIG. 2, the transmission 38 can include a rotatable output shaft 42.

As illustrated in FIG. 2, the vehicle 10 can include a rear drive assembly 44, which can include the rotatable output shaft 42 of the transmission 38, such that the rear drive assembly 44 is coupled with the engine 36. As subsequently discussed further, the rear drive assembly 44 can also be coupled with the rear wheels 14, such that the rear drive assembly 44 is operable for transmitting torque from the transmission 38 to the rear wheels 14.

The vehicle 10 can also include a forward drive assembly 50. The forward drive assembly 50 can include a rotatable front drive shaft 52 and a front differential 54 that are coupled with one another. The forward drive assembly 50 can also include a pair of rotatable front axle shafts 56, with each of the front axle shafts 56 being coupled with the front differential 54 and with a respective one of the front wheels 12. The front differential 54 can be configured to selectively vary the rotational speeds of the front wheels 12 with respect to one another. For example, when the vehicle 10 is navigating a turn, the front wheels 12 can rotate at different rotational speeds with respect to one another. In particular, the front differential 54 can be configured such that an increased rotational speed in one front wheel 12 causes a decreased rotational speed in the other front wheel 12.

Vehicle 10 can also include a transfer assembly 60 that can be associated with the output shaft 42 of the transmission 38. The transfer assembly 60 can be configured to selectively couple the front drive shaft 52 with the output shaft 42 (e.g., with a chain or gears) to facilitate changing operation of the vehicle 10 from a two-wheel drive (2WD) mode to a four-wheel drive (4WD) mode. For example, when the output shaft 42 is uncoupled from the front drive shaft 52, only the rear wheels 14 are driven by the engine 36 such that the vehicle 10 operates in a rear-wheel 2WD mode. When the output shaft 42 is coupled with the front drive shaft, the front wheels 12 and the rear wheels 14 are driven by the engine 36 such that the vehicle 10 operates in a 4WD mode. In alternate embodiments, transfer assemblies can be provided that accommodate other modes of operation, that can include a 2WD mode in which only the front wheels are driven. Vehicle 10 can include a 2WD/4WD lever 62 (FIG. 1) that is movable between a 2WD position and a 4WD position. The lever 62 can be provided adjacent to the handlebar assembly 16, within easy reach of an operator seated upon a straddle-type seat 64, which can be supported by the frame 30.

Figure 3:
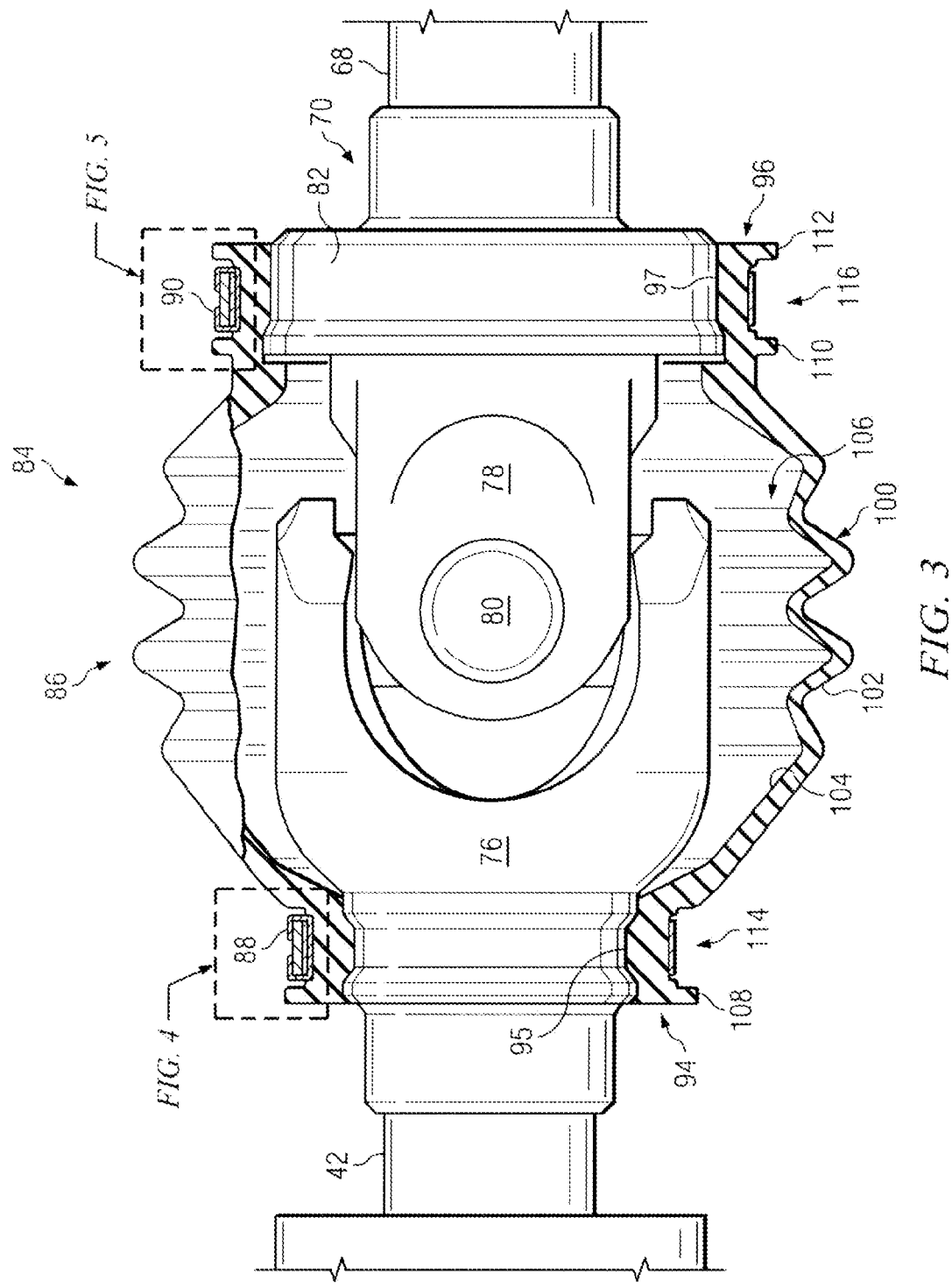
FIG. 3 is a cross-sectional view of the boot assembly shown in FIG. 2, and associated portions of the rear drive assembly shown in FIG. 2.

With reference to FIGS. 2 and 3, the rear drive assembly 44 can also include a rotatable rear drive shaft 68 and a joint 70 that can couple the output shaft 42 of the transmission 38 with the rear drive shaft 68. The rear drive assembly 44 can also include a rear final gear 72 coupled with the rear drive shaft 68. The rear final gear 72 can be coupled with a pair of rear axles 74 that can be rotatably coupled with the rear wheels 14. In one embodiment, a differential can be used in lieu of the rear final gear 72.

The joint 70 is shown in FIG. 3 to be a universal joint that includes a first yoke 76 and a second yoke 78, which can be coupled with one another with a cross-shaft assembly 80. The first yoke 76 can be coupled with the output shaft 42 of transmission 38, e.g., with mating splines. The second yoke 78 can be coupled with the rear drive shaft 68, e.g., with mating splines. Alternatively, in other embodiments, first and second yokes can be provided that are integrally formed, as unitary members, with an output shaft of a transmission and a rear drive shaft, respectively. The yoke 78 can include a shell 82, which can be a pressed steel shell in one embodiment. The shell 82 can locally increase a diameter of yoke 78, for a subsequently described purpose.

The rear drive assembly 44 can also include a boot assembly 84, which can surround at least a portion of the joint 70 as shown in FIG. 3. In other embodiments, boot assemblies can be provided that surround an entire joint. The boot assembly 84 can include a boot 86 and a plurality of retention bands that can be used to secure the boot 86 to the joint 70. The boot 86 can be made of an elastomeric material, e.g., natural or synthetic rubber. In one embodiment, the boot assembly 84 can include a first retention band 88, which can be used to secure the boot 86 to the first yoke 76, and a second retention band 90, which can be used to secure the boot 86 to the second yoke 78, as shown in FIG. 3. Retention bands such as retention bands 88 and 90 are known in the art. The boot 86 can protect the portions of the first and second yokes 76, 78 that are coupled with one another via the cross-shaft assembly 80, and can additionally retain a suitable lubricant, such as grease.

Figure 4:
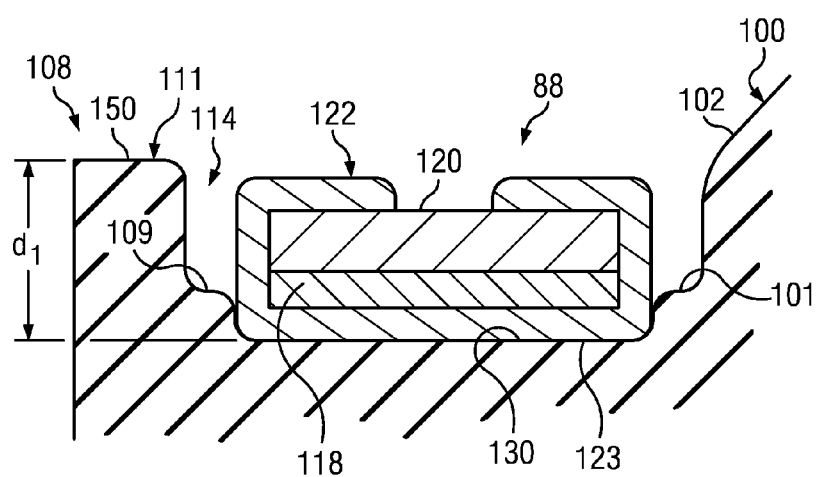
FIG. 4 is an enlarged view depicting an encircled portion of FIG. 3.
Figure 5:
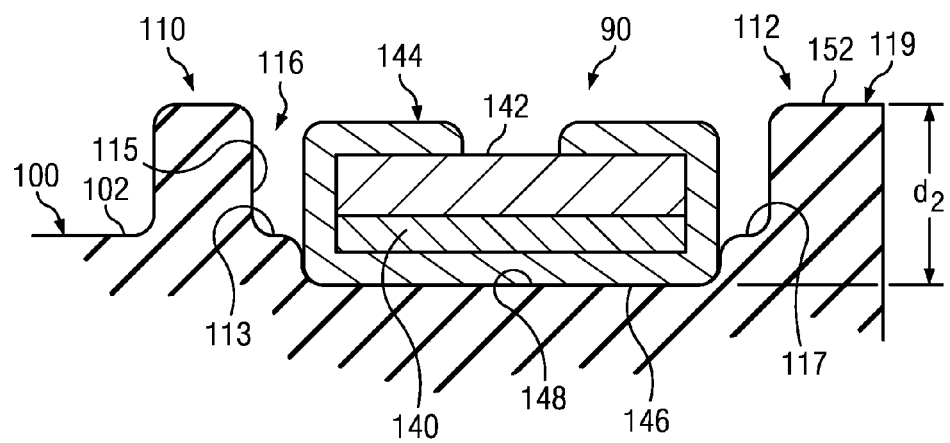
FIG. 5 is an enlarged view depicting another encircled portion of FIG. 3.

The boot 86 can include a first end 94 and a second end 96 longitudinally spaced from the first end 94. The first end 94 and the second end 96 of boot 86 can be forward and rearward ends of the boot 86, respectively. The first end 94 can define a first aperture 95 and the second end 96 can define a second aperture 97. The second aperture 97 can be larger than the first aperture 95 for purposes of assembly, i.e., to permit joint 70, when assembled, to be inserted into the boot 86 through the second aperture 97. The locally increased diameter of yoke 78 provided by shell 82 can facilitate securing boot 86 to yoke 78. Boot 86 can further include an annular wall 100 having an outer surface 102 and an inner surface 104 that defines a hollow interior 106. A portion of the joint 70 is shown in FIG. 3 to be positioned within the hollow interior 106. The boot 86 can also include a plurality of ribs, which can be used in cooperation with the annular wall 100 to define annular channels to receive the retention bands 88, 90. In one embodiment, the boot 86 can include a first rib 108, a second rib 110 and a third rib 112. Each of the ribs 108, 110 and 112 can be integral with the annular wall 100 and extend radially outwardly from the annular wall 100. The first end 94 can include the first rib 108 and the second end 96 can include the second and third ribs 110, 112, as shown in FIG. 3. As shown in FIG. 4, the first rib 108 can include a stepped portion 109 and a remaining portion 111, and the annular wall 100 can include a stepped portion 101. As shown in FIG. 5, the second rib 110 can include a stepped portion 113 and a remaining portion 115, and the third rib 112 can include a stepped portion 117 and a remaining portion 119.

The first rib 108 and the annular wall 100 can cooperate to define a first annular channel 114, which is configured to receive the first retention band 88 as shown in FIGS. 3 and 4. The outer surface 102 of the annular wall 100 can cooperate with the first rib 108 to define the first annular channel 114. The second rib 110 and the third rib 112 can cooperate with the annular wall 100 of boot 86 to define a second annular channel 116 as shown in FIGS. 3 and 5. The outer surface 102 of the annular wall 100 can cooperate with the second and third ribs 110, 112 to define the second annular channel 116.

Figure 6:
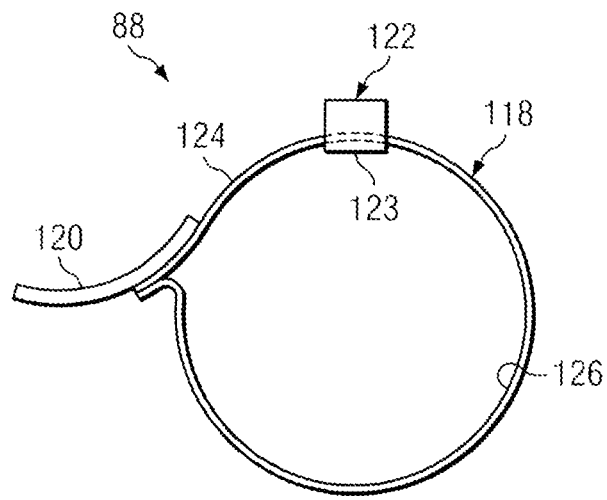
FIG. 6 is an elevational view of a Prior Art retention band of the boot assembly depicted in FIG. 3, with a lever of the Prior Art retention band being depicted in a first, open position.
Figure 7:
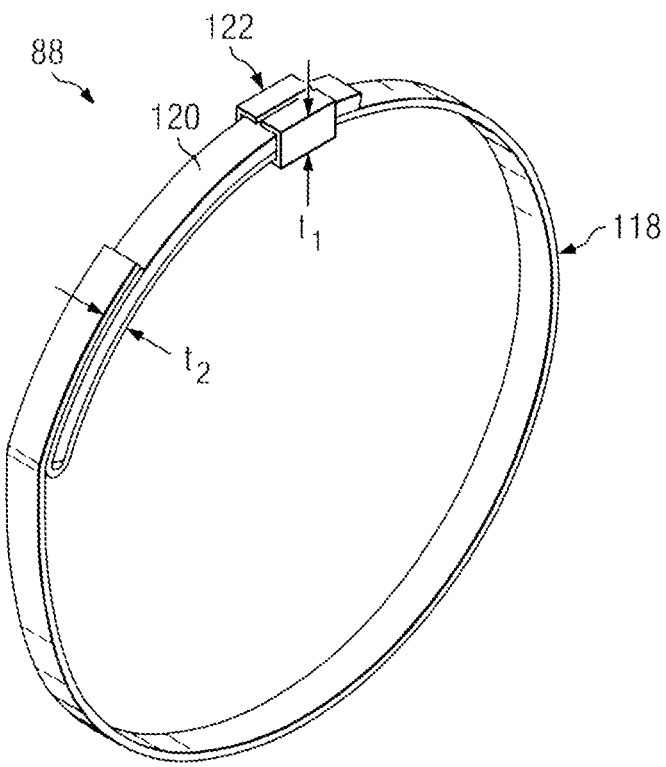
FIG. 7 is a perspective view of the Prior Art retention band shown in FIG. 6, with the lever being depicted in a second, closed position.

Prior Art FIGS. 6 and 7 depict the first retention band 88. The second retention band 90 can have the same, or substantially the same, configuration as the first retention band 88, although possibly with different dimensions. A conventional retention band having the same configuration as retention bands 88 and 90 is shown in FIGS. 8-12 of U.S. Pat. No. 7,395,582, which is hereby expressly incorporated by reference herein in its entirety. The retention band 88 can include a first ring 118, a first lever 120 that can be attached to the first ring 118, and a first clasp 122 associated with the first ring 118. In one embodiment, each of the first ring 118, the first lever 120, and the first clasp 122 can be formed from metal, such as stainless steel. However, in other embodiments, other suitable materials can be used. The first lever 120 can be attached (e.g., with welding and/or adhesives) to an outer surface 124 of the first ring 118. In one embodiment, the first clasp 122 can be formed separately from the first ring 118 and can include a base that is attached to an inner surface 126 of the first ring 118. In other embodiments, clasps can be provided that are integral with either a ring or a lever of a retention band.

The first lever 120 can be movable between a first, open position shown in FIG. 6 and a second, closed position shown in FIG. 7. When the first retention band 88 is positioned within the first annular channel 114 and the first lever 120 is moved to the closed position, a circumference of the inner surface 126 of the first ring 118 becomes smaller, such that boot 86 is compressed. After the first lever 120 is moved from the open position to the closed position, opposite side walls of the first clasp 122 can be folded such that the first clasp 122 engages the first lever 120 to retain the first lever 120 in the closed position, which seats the first retention band 88 within the first annular channel 114 as shown in FIG. 4 and secures the boot 86 to the first yoke 76 of joint 70. The outer surface 102 of the annular wall 100 of boot 86 can include a first generally cylindrical portion 130, which can partially define the first annular channel 114 as shown in FIG. 4. When the first retention band 88 is seated within the first annular channel 114, an inner surface 123 of the first clasp 122 can be in contacting engagement with the first generally cylindrical portion 130 of the outer surface 102, and a substantial portion of the inner surface 126 of the first ring 118 can also be in contacting engagement with the first generally cylindrical portion 130 of the outer surface 102 of the annular wall 100. Additionally, when the first retention band 88 is seated within the first annular channel 114, the first retention band 88 can be positioned longitudinally adjacent to the stepped portion 109 of the first rib 108 and the stepped portion 101 of the annular wall 100, and can be longitudinally spaced from the remaining portion 111 of the first rib 108, as shown in FIG. 4.

When the first clasp 122 is configured as shown in FIGS. 4 and 7, the first clasp 122 has a thickness $t_1$ (FIG. 7). It will be appreciated that a clasp can be provided in a variety of other suitable configurations. Also, when the first lever 120 is in the closed position shown in FIGS. 4 and 7, the first retention band 88 has a thickness $t_2$ (FIG. 7) that can be equal to, or substantially equal to, a thickness of the first lever 120 plus three times a thickness of the first ring 118.

Similar to the first retention band 88, the second retention band 90 can include a second ring 140, a second lever 142 attached to the second ring 140, and a second clasp 144 associated with the second ring 140 and selectively engaged with the second lever 142. The second lever 142 can be movable between a first, open position (not shown) and a second, closed position shown in FIG. 5. The second clasp 144 can include an inner surface 146. The outer surface 102 of the annular wall 100 of boot 86 can include a second generally cylindrical portion 148, which can cooperate with the second rib 110 and the third rib 112 to define the second annular channel 116, as shown in FIG. 5. When the second retention band 90 is positioned within the second annular channel 116 and the second lever 142 is moved to the closed position, a circumference of an inner surface of the second ring 140 becomes smaller such that boot 86 is compressed. After the second lever 142 is moved from the open position to the closed position, opposite side walls of the second clasp 144 can be folded such that the second clasp 144 engages the second lever 142 to retain the second lever in the closed position, which seats the second retention band 90 within the second annular channel 116 as shown in FIG. 5 and secures the boot 86 to the second yoke 78 of the joint 70. When the second retention band 90 is seated within the second annular channel 116, the inner surface 146 of the second clasp 144 can be in contacting engagement with the second generally cylindrical portion 148 of the outer surface 102 of annular wall 100, as shown in FIG. 5, and a substantial portion of the inner surface of the second ring 140 can also be in contacting engagement with the second generally cylindrical portion 148 of the outer surface 102 of annular wall 100. Additionally, when the second retention band 90 is seated within the second annular channel 116, the second retention band 90 can be positioned longitudinally adjacent to each of the stepped portion 113 of the second rib 110 and the stepped portion 117 of the third rib 112, and can be longitudinally spaced from each of the remaining portion 115 of the second rib 110 and the remaining portion 119 of the third rib 112.

Referring to FIG. 4, the first annular channel 114 can have a depth $d_1$ that can be measured from the first generally cylindrical portion 130 of the outer surface 102 of the annular wall 100 to a radially outermost surface 150 of the first rib 108. The magnitude of the depth $d_1$ of the first annular channel 114 can be greater than a maximum thickness of the first retention band 118, e.g., the depth $d_1$ can be greater than the magnitudes of each of the thicknesses $t_1$ and $t_2$ of the first retention band 88, such that the first rib 108 extends radially outwardly beyond the first ring 118, the first lever 120 and the first clasp 122 of the first retention band 88, when the first retention band 88 is seated within the first annular channel 114.

Referring to FIG. 5, the second annular channel 116 can have a depth that can be measured from the second generally cylindrical portion 148 of the outer surface 102 of the annular wall 102, to an upper surface of one of the ribs 110, 112. In one embodiment, the second rib 110 and the third rib 112 can have the same height such that the depth of the second channel 116 can be measured to an upper surface of either one of the first and second ribs 110, 112. For example, in this instance, the second annular channel can have a depth $d_2$ that can be measured from the second generally cylindrical portion 148 of the outer surface 102, to a radially outermost surface 152 of the third rib 112. In other embodiments, the second rib 110 and the third rib 112 can have different heights. In these other embodiments, the depth of the second annular channel 116 can be measured from the second generally cylindrical portion 148 of outer surface 102 to the upper surface of the shortest one of the second and third ribs 110, 112. The magnitude of the depth of the second annular channel 116 (e.g., $d_2$) can be greater than a maximum thickness of the second retention band 90, such that each of the second and third ribs 110, 112 extends radially outwardly beyond the second ring 140, the second lever 142 and the second clasp 144 of the second retention band 90, when the second retention band 90 is seated within the second annular channel 116.

While boot assembly 84 has been shown for use in the rear drive assembly 44, with the boot 86 surrounding a portion of joint 70, which is shown to be a universal joint, it will be appreciated that boot assemblies can be provided for use in other drive assemblies, and/or in conjunction with other types of joints, such as constant velocity (CV) joints, which have a configuration that is known in the art. In this regard, boot assemblies can be provided for use at one or more locations in the forward drive assembly 50, for example, to at least partially surround a joint (not shown) that couples the front drive shaft 52 with the front differential 54 and/or to at least partially surround a joint (not shown) that couples the front drive shaft 52 with the transfer assembly 60. In one embodiment, each of these joints can be a universal joint, which can be the same as, or substantially the same as, universal joint 70. As another example, boot assemblies can be provided to at least partially surround one or both of the joints (not shown) that couple the front axle shafts 56 to the front differential 54. In one embodiment, each of these joints can be CV joints.

Use of boot assemblies such as boot assembly 84 can provide various advantages. For example, the depths $d_1, d_2$, of the first annular channel 114 and the second annular channel 116, respectively, can be sized such that the retention bands 88, 90 are less exposed during operation of the all terrain vehicle 10. Accordingly, it is less likely that passing debris can catch on the retention bands 88, 90, which can at least reduce the likelihood of passing debris becoming entangled on the output shaft 42 of transmission 38 and/or the rear drive shaft 68 during operation of vehicle 10 that could result in an undesirable unbalance of the respective shaft(s). Furthermore, the clasps 122, 144 of the first and second retention bands 88, 90, respectively, are less likely to be released by the passing debris.

While boot assembly 84 includes a boot 86 that defines the first annular channel 114 and the second annular channel 116, in other embodiments, boot assemblies can be provided that include a boot that defines a pair of annular channels, with each configured similar to the first annular channel 114, i.e., with each of the pair of channels being defined by an annular wall of the boot and a single rib extending radially outwardly from the boot. In other embodiments, a boot assembly can be provided that includes a boot that defines a pair of annular channels, with each configured similar to the second annular channel 116, i.e., with each of the pair of channels being defined by an annular wall of the boot and a pair of ribs that are spaced from one another and that extend radially outwardly from the annular wall.

While various embodiments of a boot assembly, a drive assembly and a vehicle, have been illustrated by the foregoing description and have been described in considerable detail, it is not intended to restrict or in any way limit the scope of the appended claims to such detail. Additional modifications will be readily apparent to those skilled in the art.

What is claimed is:

1. A boot assembly comprising:
a boot; and
a first retention band comprising a first ring, a first lever attached to the first ring, and a first clasp associated with the first ring and configured for selective engagement with the first lever; wherein
the boot comprises an annular wall defining a hollow interior configured to receive a portion of a drive assembly of a vehicle;
the boot further comprises a first rib, the first rib being integral with the annular wall and extending radially outwardly from the annular wall, the first rib and the annular wall cooperating to define a first annular channel;
the first annular channel is configured to receive the first retention band;
the first rib extends radially outwardly beyond the first ring, the first lever and the first clasp of the first retention band when the first retention band is seated within the first annular channel;
the first rib comprises a stepped portion and a remaining portion;
the annular wall comprises a stepped portion; and
when the first retention band is seated within the first annular channel, the first retention band is position longitudinally adjacent to each of stepped portion of the first rib and the stepped portion of the annular wall; and is longitudinally spaced from the remaining portion of the first rib.

2. The boot assembly of claim 1, further comprising:
a second retention band comprising a second ring, a second lever attached to the second ring, and a second clasp associated with the second ring and configured for selective engagement with the second lever; wherein
the boot further comprises a second rib and a third rib, each of the second rib and the third rib being integral with the annular wall and extending radially outwardly from the annular wall;
the second rib cooperates with the third rib and the annular wall to define a second annular channel configured to receive the second retention band; and
each of the second rib and the third rib extends radially outwardly beyond the second ring, the second lever and the second clasp of the second retention band when the second retention band is seated within the second annular channel.

3. The boot assembly of claim 2, wherein:
the annular well of the boot comprises an inner surface and an outer surface, the inner surface defining the hollow interior;
the outer surface cooperates with the first rib to define the first annular channel; and
the outer surface cooperates with the second rib and the third rib to define the second annular channel.

4. The boot assembly of claim 3, wherein:
the first annular channel of the boot has a first depth; and
the first depth is greater than a maximum thickness of the first retention band when the first retention band is seated within the first annular channel.

5. The boot assembly of claim 4, wherein:
the second annular channel of the boot has a second depth; and the second depth is greater than a maximum thickness of the second retention band when the second retention band is seated within the second annular channel.

6. The boot assembly of claim 2, wherein:
the first annular channel has a first depth;
the second annular channel has a second depth;
the first clasp has a first thickness;
the second clasp has a second thickness;
the first depth is greater than the first thickness; and
the second depth is greater than the second thickness.

7. The boot assembly of claim 2, wherein:
each of the second rib and the third rib respectively comprises a stepped portion and a remaining portion; and
when the second retention band is seated within the second annular channel, the second retention band is positioned longitudinally adjacent to each of the stepped portion of the second rib and the stepped portion of the third rib, and is longitudinally spaced from each of the remaining portion of the second rib and the remaining portion of the third rib.

8. A drive assembly comprising:
a first rotatable shaft;
a second rotatable shaft;
a joint coupling the first rotatable shaft with the second rotatable shaft; and
a boot assembly comprising a boot and a first retention band; wherein
the first retention band comprises a first ring, a first lever attached to the first ring, and a first clasp associated with the first ring;
the boot comprises an annular wall defining a hollow interior, at least a portion of the joint being positioned within the hollow interior such that the boot surrounds the at least a portion of the joint;
the boot further comprises a first rib, of the first rib being integral with the annular wall and extending radially outwardly from the annular wall, the first rib and the annular wall cooperating to define a first annular channel;
the first retention band is positioned within the first annular channel and the first clasp engages the first lever such that the first retention band is seated within the first annular channel and secures the boot to one of the joint and the first rotatable shaft;
the first rib extends radially outwardly beyond the first ring, the first lever and the first clasp of the first retention band when the first retention band is seated within the first annular channel;
the first rib comprises a stepped portion and a remaining portion;
the annular wall comprises a stepped portion; and
when the first retention band is seated within the first annular channel, the first retention band is positioned longitudinally adjacent to each of the stepped portion of the first rib and the stepped portion of the annular wall, and is longitudinally spaced from the remaining portion of the first rib.

9. The drive assembly of claim 8, wherein:
one of the first and second rotatable shafts is configured for coupling to a rear final gear of a vehicle; and
the joint comprises a universal joint.

10. The drive assembly of claim 8, wherein:
the joint comprises a constant velocity joint.

11. The drive assembly of claim 8, wherein:
the boot assembly further comprises a second retention band;

the second retention band comprises a second ring, a second lever attached to the second ring and a second clasp associated with the second ring;
the boot further comprises a second rib and a third rib, each of the second rib and the third rib being integral with the annular wall and extending radially outwardly from the annular wall;
the second rib and the third rib cooperate with the annular wall to define a second annular channel;
the second retention band is positioned within the second annular channel and the second clasp engages the second lever such that the second retention band is seated within the second annular channel and secures the boot to one of the joint and the second rotatable shaft; and
each of the second rib and the third rib extends radially outwardly beyond the second ring, the second lever and the second clasp of the second retention band when the second retention band is seated within the second annular channel.

12. The drive assembly of claim 11, wherein:
the annular wall of the boot comprises an inner surface and an outer surface, the inner surface defining the hollow interior;
the outer surface cooperates with the first rib to define the first annular channel; and
the outer surface cooperates with the second rib and the third rib to define the second annular channel.

13. The drive assembly of claim 12, wherein:
the first annular channel of the boot has a first depth; and
the first depth is greater than a maximum thickness of the first retention band when the first retention band is seated within the first annular channel.

14. The drive assembly of claim 13, wherein:
the second annular channel of the boot has a second depth; and
the second depth is greater than a maximum thickness of the second retention band when the second retention band is seated within the second annular channel.

15. The drive assembly of claim 11, wherein:
the first annular channel has a first depth;
the second annular channel has a second depth;
the first clasp has a first thickness;
the second clasp has a second thickness;
the first depth is greater than the first thickness; and
the second depth is greater than the second thickness.

16. The drive assembly of claim 11, wherein:
each of the second rib and the third rib respectively comprises a stepped portion and a remaining portion; and
when the second retention band is seated within the second annular channel, the second retention band is positioned longitudinally adjacent to each of the stepped portion of the second rib and the stepped portion of the third rib, and is longitudinally spaced from each of the remaining portion of the second rib and the remaining portion of the third rib.

17. A vehicle comprising:
at least one front wheel and at least one rear wheel;
a frame, each of the at least one front wheel and the at least one rear wheel being suspended from the frame;
an engine;
a transmission coupled with the engine; and
a drive assembly coupled with one of the at least one front wheel and the at least one rear wheel; wherein
the drive assembly comprises a first rotatable shaft, a second rotatable shaft, and a joint coupling the first rotatable shaft with the second rotatable shaft;

the drive assembly further comprises a boot assembly, the boot assembly comprising a boot and a first retention band;

the boot comprises an annular wall defining a hollow interior, at least a portion of the joint being positioned within the hollow interior such that the boot surrounds the at least a portion of the joint;

the boot further comprises a first rib, the first rib being integral with the annular wall and extending radially outwardly from the annular wall, the first rib and the annular wall cooperating to define a first annular channel;

the first retention band comprises a first ring, a first lever attached to the first ring, and a first clasp associated with the first ring;

the first clasp engages the first lever such that the first retention band is seated within the first annular channel and secures the boot to one of the joint and the first rotatable shaft, with the first rib extending radially outwardly beyond the first ring, the first lever and the first clasp of the first retention band when the first retention band is seated within the first annular channel;

the first rib comprises a stepped portion and a remaining portion;

the annular wall comprises a stepped portion; and when the first retention band is seated within the first annular channel, the first retention band is positioned longitudinally adjacent to each of the stepped portion of the first rib and the stepped portion of the annular wall, and is longitudinally spaced from the remaining portion of the first rib.

18. The vehicle of claim 17, further comprising:
a straddle-type seat supported by the frame; wherein
the vehicle comprises an all terrain vehicle.

19. The vehicle of claim 17, wherein:
the boot further comprises a first end and a second end;
the first end comprises the first rib and the first annular channel; and
the second end comprises the second rib, the third rib and the second annular channel.

20. The vehicle of claim 17, wherein:
the boot assembly further comprises a second retention band;
the boot further comprises a second rib and a third rib, each of the second rib and the third rib being integral with the annular wail and extending radially outwardly from the annular wall;
the second rib and the third rib cooperate with the annular wail to define a second annular channel;
the second retention band comprises a second ring, a second lever attached to the second ring, and a second clasp associated with the second ring; and
the second clasp engages the second lever such that the second retention band is seated within the second annular channel and secures the boot to one of the joint and the second rotatable shaft, with each of the second rib and the third rib extending radially outwardly beyond the second ring, the second lever and the second clasp of the second retention band when the second retention band is seated within the second annular channel.

21. The vehicle of claim 20, wherein:
the annular wall of the boot comprises an inner surface and an outer surface, the inner surface defining the hollow interior of the boot;
the outer surface cooperates with the first rib to define the first annular channel; and
the outer surface cooperates with the second rib and the third rib to define the second annular channel.

22. The vehicle of claim 21, wherein:
the first annular channel has a first depth; and
the first depth is greater than a maximum thickness of the first retention band when the first retention band is seated within the first annular channel.

23. The vehicle of claim 22, wherein:
the second annular channel of the boot has a second depth; and
the second depth is greater than a maximum thickness of the second retention band when the second retention band is seated within the second annular channel.

24. The vehicle of claim 20, wherein:
one of the first and second rotatable shafts comprises an output shaft of the transmission;
the drive assembly further comprises a rear final gear coupled with the at least one rear wheel; and
the other of the first and second rotatable shafts comprises a rear drive shaft coupled with the rear final gear.

25. The vehicle of claim 24, wherein:
each of the first retention band and the second retention band secures the boot to the joint.

26. The vehicle of claim 20, wherein:
the first annular channel has a first depth;
the second annular channel has a second depth;
the first clasp has a first thickness;
the second clasp has a second thickness;
the first depth is greater than the first thickness; and
the second depth is greater than the second thickness.

27. The vehicle of claim 20, wherein:
each of the second rib and the third rib respectively comprises a stepped portion and a remaining portion; and
when the second retention band is seated within the second annular channel, the second retention band is positioned longitudinally adjacent to each of the stepped portion of the second rib and the stepped portion of the third rib, and is longitudinally spaced from each of the remaining portion of the second rib and the remaining portion of the third rib.

\* \* \* \* \*

UNITED STATES PATENT AND TRADEMARK OFFICE
CERTIFICATE OF CORRECTION

PATENT NO. : 8,640,815 B2  
APPLICATION NO. : 13/024483  
DATED : February 4, 2014  
INVENTOR(S) : Lee N. Bowers Page 1 of 1

It is certified that error appears in the above-identified patent and that said Letters Patent is hereby corrected as shown below:

In the Claims

Claim 1, column 8, line 32, change "wall;" to --wall,--;
Claim 8, column 9, line 35, change "rib, of the" to --rib, the--;
Claim 20, column 11, line 46, change "wail" to --wall--; and
Claim 20, column 11, line 49, change "wail" to --wall--.

Signed and Sealed this
Fifteenth Day of April, 2014

Michelle K. Lee
*Deputy Director of the United States Patent and Trademark Office*